W. H. PRATT.
ELECTRIC METER.
APPLICATION FILED MAR. 18, 1914.

1,177,444.

Patented Mar. 28, 1916.
2 SHEETS—SHEET 1.

Witnesses:
Helen Oxford
Benjamin B. Hull

Inventor:
William H. Pratt,
by His Attorney.

W. H. PRATT.
ELECTRIC METER.
APPLICATION FILED MAR. 18, 1914.

1,177,444.

Patented Mar. 28, 1916.
2 SHEETS—SHEET 2.

Witnesses:
Helen Orford
Benjamin B. Hull

Inventor:
William H. Pratt,
by His Attorney.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC METER.

1,177,444.    Specification of Letters Patent.    Patented Mar. 28, 1916.

Application filed March 18, 1914. Serial No. 825,528.

*To all whom it may concern:*

Be it known that I, WILLIAM H. PRATT, a citizen of the United States, residing at Lynn, county of Essex, State of Massachusetts, have invented certain new and useful Improvements in Electric Meters, of which the following is a specification.

My invention relates to electric meters.

The objects of my invention are to generally improve the construction of electric meters and to provide a meter having comparatively few parts, and one in which the operative elements are easily assembled and conveniently exposed for inspection and repair, and further one of pleasing, neat and symmetrical external appearance. These features I attain by providing a novel form and arrangement of terminal chamber, an improved terminal construction and a novel type of damping magnet which is peculiarly advantageous for use in electric meters.

Other specific objects of my invention will be noted hereinafter.

The features of my invention which I deem patentably novel are definitely pointed out in the claims appended hereto.

The construction and method of operation of an induction electric meter embodying the novel features of my invention will be understood from the following description taken in connection with the accompanying drawings in which—

Figure 1:
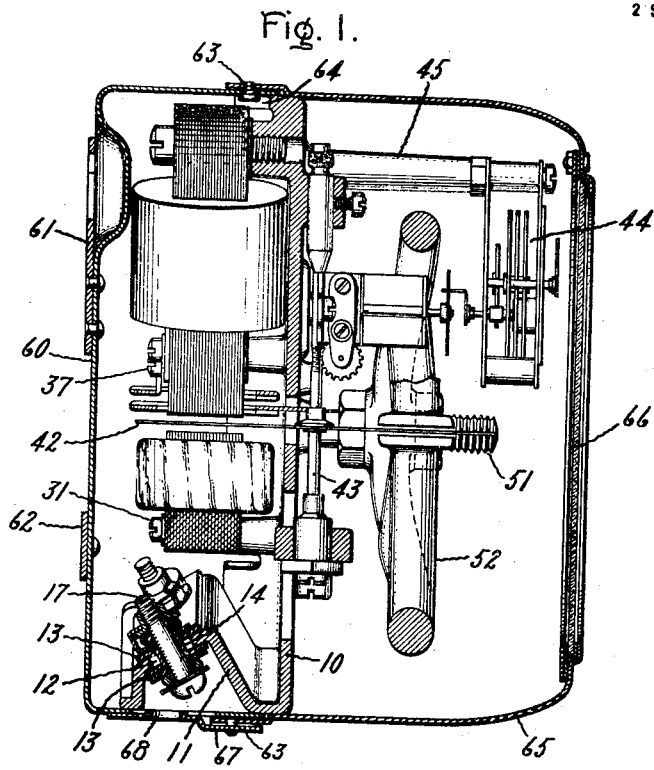
Figure 2:
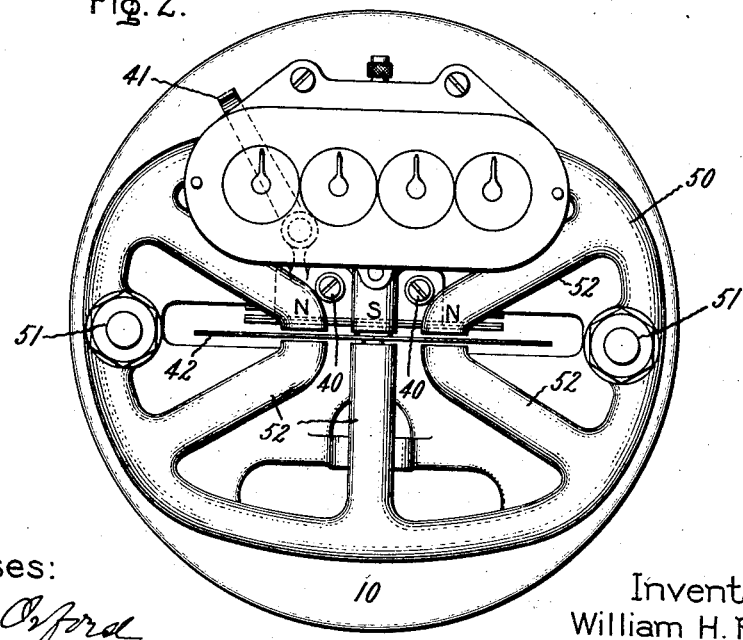
Figure 3:
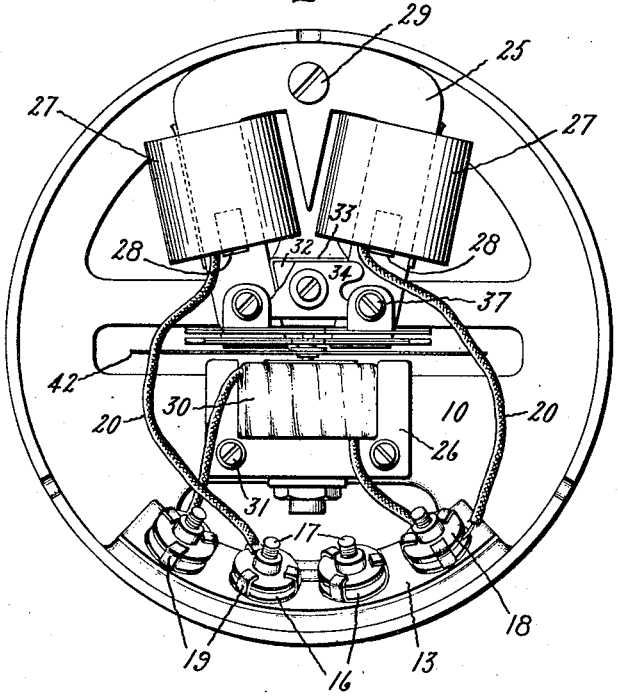
Figure 4:
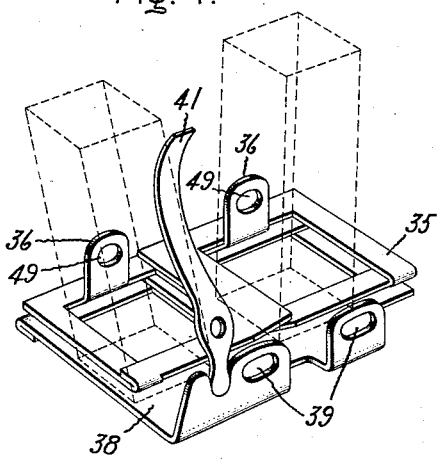
Figure 5:
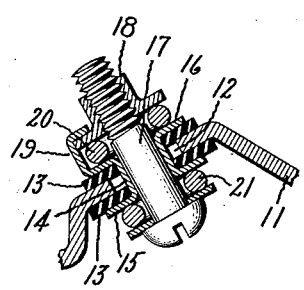

Figure 1 is a sectional end elevation of a meter embodying the novel features of my invention; Fig. 2 is a front elevation of the meter removed from its inclosing casing; Fig. 3 is a rear elevation of the meter also removed from the inclosing casing; Fig. 4 is a detail view showing the arrangement of the friction compensating and phase lagging devices; and Fig. 5 is a detail view in cross section illustrating my novel terminal construction.

The operative elements of the meter are mounted upon a central supporting member 10 of magnetic material. The peripheral outline of the supporting member is circular, as shown in Figs. 2 and 3. A terminal chamber 11 is integrally secured to the supporting member and is positioned entirely within the peripheral outline of the member. The general configuration of the terminal chamber will be best seen by reference to Fig. 1 of the drawings. The terminal chamber is circular in shape, conforming with the outline of the supporting member, and has a trough-like recess in which the terminals are located.

The interior wall of the terminal chamber is provided with four circular openings 12. A strip of insulating material 13, such as fiber, is arranged on each side of the interior wall. These strips of insulating material are provided with circular openings of smaller diameter than the openings 12 and concentrically arranged with the latter. A metallic sleeve 14 passes through the registering openings in the fiber strips and in the interior wall of the supporting member and is provided with bent portions or flanges 15 engaging the outside surface of one of the insulating strips and other flanges 16 engaging the outside surface of the other insulating strip. A bolt 17 passes through the sleeve and is provided with a nut 18. Fingers 19 are integrally attached to the sleeve 14 and are adapted to be bent over the head of the nut 18. A conductor 20, adapted for connection to one of the coils of the meter, is arranged between the head of the nut 18 and the flange 16, and another conductor 21, adapted for connection to the line, is arranged between the head of the bolt 17 and the flange 15. It will thus be observed that all the parts of this terminal are rigidly secured together by tightening the bolt 17.

The magnetic elements of the meter comprise a potential core 25 and a series or current core 26. These cores consist of the usual bundle of laminations of magnetic material. The potential core 25 is generally U-shaped with its legs inwardly inclined, as clearly shown in Fig. 3 of the drawings. A bundle of laminations 32 is mounted between the ends of the two legs of the core 25. A piece of insulating material 33, such as horn fiber, separates the laminations 32 from the laminations of the potential core. The laminations 32 are bound together and held in position by clamping strips 34 of nonmagnetic material. A potential coil 27 is mounted upon each leg of the core 25, and is held in position by means of tongues 28 slit from the outside laminations of the core. The core 25 is secured to the supporting member 10 by a bolt 29.

The current core is substantially rectangular in shape and has three legs, with a current coil 30 mounted upon the center leg and positioned in the space between the center and outside legs. The poles of the potential core are mounted substantially opposite the gaps between the center and outside legs of the series core, as shown in Fig. 3 of the drawings. The series core is mounted on the supporting member 10 by means of bolts 31. Conductors 20 connect the potential and series coils to the meter terminals as heretofore explained.

A phase lagging plate 35 shaped generally like a figure 8 is mounted to surround each of the legs of the potential core with a metallic short circuit. This phase lagging plate is made from a single punched blank, as will be clearly seen by reference to Fig. 4 of the drawings. Attaching members 36 are integrally secured to the phase lagging plate and are adapted to be attached to the rear of the potential core by bolts 37, as illustrated in Figs. 1 and 3 of the drawings. The position of the phase lagging plate can be adjusted by providing slots 49 in the attaching members 36, as illustrated in Fig. 4.

A friction compensating plate 38 of the same general construction as the phase lagging plate 35 is operatively mounted below the latter plate. The two openings of the friction compensating plate also surround the legs of the potential core. The friction compensating plate has an attaching member provided with slots 39. The attaching member is secured to the front of the supporting member 10 by means of bolts 40, and the position of the plate 38 can be adjusted by loosening the bolts 40 and manipulating a coöperatively positioned lever 41, as will be evident from an inspection of Figs. 2 and 4 of the drawings.

A disk armature 42 of aluminum or other suitable metallic material is secured to a rotatably mounted shaft 43. The bearings for the shaft 43 are suitably carried by the supporting member 10. The shaft drives through suitable ratio gearing the usual meter register 44. The register is secured to posts 45 which are integrally attached to the supporting member 10.

A damping magnet 50 of novel and improved construction is secured by bolts 51 to the supporting member 10. The magnet has a continuous outer ring and a plurality of inwardly extending members 52 integrally secured thereto. The inwardly extending members 52 are arranged in pairs and have an air gap between the members of each pair in which the armature 42 is adapted to rotate. The outer continuous ring and inwardly extending members of the magnet are cast as an integral structure, and the air gap between the inwardly extending members is made by sawing through these members. In magnetizing the magnet, coils are suitably arranged upon the inwardly projecting members so that poles of alternate polarity are provided on each side of the armature. This arrangement of the poles of the magnet is indicated in Fig. 2 of the drawings by reference letters N and S. It will thus be seen that I have provided a cast magnet having a plurality of pairs of poles, with poles of alternate polarity on each side of the rotating element 42. This construction of the damping magnet enables the magnet to be secured to its supporting member at its neutral points. Furthermore, the alternate arrangement of north and south poles on each side of the damping member provides a greater eddy current loss and hence a more effective damping.

It will be observed from the foregoing description that all of the operative elements of the meter are mounted on a single supporting member. The motive elements are secured to one side of the supporting member, as shown in Fig. 3 of the drawings, and the register and damping magnet are secured to the other side of the member, as shown in Fig. 2 of the drawings. A casing such as illustrated in Fig. 1 is provided for inclosing the supporting member and attached operative elements. This casing comprises a rear inclosing member 60 having a keyholed plate 61, of the usual type, secured thereto for supporting the meter. A plate 62 is also secured to the rear inclosing member and assists in supporting the meter. The rear inclosing member 60 is constructed of suitably rigid material, such for example as relatively heavy sheet metal, and the supporting member 10 fits very snugly in this inclosing member so that the supporting member and the meter elements thereto attached are in fact supported by the rear inclosing member 60. The meter is adapted to be mounted in position by means of the keyholed plate 61 and the plate 62, the ends of the latter extending beyond the periphery of the member 60 so as to provide supporting extensions. The rear inclosing member 60 is also provided with pins 63, which have enlarged heads adapted to register with recesses 64 in the supporting member 10. A front inclosing member 65 having a circular glass window 66 is secured to the rear inclosing member 60 by means of the pins 63 and bayonet joint slots in the member 65. A plate 67 having suitable openings 68 for leading-in wires is arranged to close the terminal chamber. It will thus be observed that the casing of the meter is cylindrical in shape and entirely symmetrical. The terminal chamber is located within the casing and is adapted to be removed as a unit with the supporting member and other attached elements from the casing. This is of particular advantage, since it enables a quick and convenient inspection of the operative elements of the meter without disconnecting the coil conductors from the meter terminals.

Numerous changes and modifications in the meter construction herein shown and described for the purposes of illustration without departing from the spirit of my invention will be apparent to those skilled in the art. Further, the application of the novel features of my invention to other types of electric meters than that herein illustrated will be obvious, and I do not, therefore, desire to be limited to the specific construction or to the particular type of meter herein illustrated by way of example. I, accordingly, aim to cover in the appended claims all applications and modifications of my invention within the spirit and scope of the same.

What I claim as new and desire to secure by Letters Patent of the United States, is,—

1. In an electric motor meter, a rotatable element, and a damping magnet having a plurality of poles of alternate polarity arranged on one side of said element and a plurality of coöperating poles of alternate polarity arranged on the other side of said element and a member magnetically and mechanically connecting said poles thereby forming a unitary magnet structure.

2. In an electric motor meter, a rotatable element, a clamping magnet for said element comprising a continuous outer member and a plurality of inwardly extending members united in a unitary structure, said inwardly extending members being arranged in pairs with an air gap between the members of each pair whereby said magnet has a plurality of pairs of poles.

3. In an electric motor meter, a rotatable element, a damping magnet comprising a continuous outer member and a plurality of inwardly extending members united in a unitary structure, said inwardly extending members being arranged in pairs with an air gap between the members of each pair whereby said magnet has a plurality of pairs of poles, and means whereby said magnet can be attached at its neutral points to a fixed part of the meter.

4. In an electric motor meter, a rotatable element, and a damping magnet for said element comprising a continuous outer ring and a plurality of inwardly extending members arranged in pairs with an air gap between the members of each pair whereby said magnet has a plurality of pairs of poles.

5. In an electric motor meter, a damping magnet comprising a continuous outer ring and a plurality of inwardly extending members arranged in pairs with an air gap between the members of each pair whereby said magnet has a plurality of pairs of poles, a disk rotatably mounted in the air gaps, and means whereby said magnet can be attached at its neutral points to a fixed part of the meter.

6. In an electric motor meter, a substantially circular supporting member, a terminal chamber forming extension arranged within the peripheral outline of said member and attached thereto, meter elements operatively mounted on said member so that the member and all of the attached elements can be removed as a single unit from a meter casing adapted to inclose said member and all of said elements.

7. In an electric motor meter, a substantially circular magnetic supporting member, a rotatably mounted disk armature extending through said member, motive elements mounted on one side of said member, a damping magnet and a meter register operatively mounted on the other side of said member, a terminal chamber forming extension integrally attached to said supporting member and arranged within the peripheral outline of said member, said member and all of the attached elements being so arranged that they can be removed as a single unit from a meter casing adapted to inclose the member and all of the attached elements.

8. In an electric meter, a supporting member, a terminal chamber forming extension arranged within the peripheral outline of said member and integrally attached thereto, said chamber having a wall with a plurality of holes therein, a strip of insulating material on each side of said wall and having holes therein concentrically arranged with the holes in said wall, a sleeve extending through each of said holes and having flanged end portions adapted to engage the outside surfaces of said strips, and a bolt passing through said sleeve and having a nut thereon.

In witness whereof, I have hereunto set my hand this fourteenth day of March, 1914.

WILLIAM H. PRATT.

Witnesses:
John A. McManus, Jr.,
Frank G. Hattie.

Copies of this patent may be obtained for five cents each, by addressing the "Commissioner of Patents, Washington, D. C."

It is hereby certified that in Letters Patent No. 1,177,444, granted March 28, 1916, upon the application of William H. Pratt, of Lynn, Massachusetts, for an improvement in "Electric Meters," an error appears in the printed specification requiring correction as follows: Page 3, line 31, claim 2, for the word "clamping" read *damping;* and that the said Letters Patent should be read with this correction therein that the same may conform to the record of the case in the Patent Office.

Signed and sealed this 25th day of April, A. D., 1916.

[SEAL.]

Cl. 171—264.

J. T. NEWTON,

*Acting Commissioner of Patents.*